US012287757B2

(12) United States Patent
Kumar et al.

(10) Patent No.: US 12,287,757 B2
(45) Date of Patent: Apr. 29, 2025

(54) DATA ARCHIVAL RECOMMENDATION SYSTEMS USING ARTIFICIAL INTELLIGENCE TECHNIQUES

(71) Applicant: Dell Products L.P., Round Rock, TX (US)

(72) Inventors: Dhilip S. Kumar, Bangalore (IN); Ponnayan Sekar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 18/078,340

(22) Filed: Dec. 9, 2022

(65) Prior Publication Data

US 2024/0193123 A1 Jun. 13, 2024

(51) Int. Cl.
*G06F 17/00* (2019.01)
*G06F 7/00* (2006.01)
*G06F 16/11* (2019.01)

(52) U.S. Cl.
CPC .......... *G06F 16/125* (2019.01); *G06F 16/113* (2019.01)

(58) Field of Classification Search
CPC ............................ G06F 16/125; G06F 16/113
USPC .......................................................... 707/694
See application file for complete search history.

(56) References Cited

U.S. PATENT DOCUMENTS 8,438,138 B2 5/2013 Rathi et al.
8,533,231 B2 9/2013 Aizman et al.
11,126,506 B2 * 9/2021 Martynov .......... G06F 11/1461
11,966,360 B2 * 4/2024 Narayanan .............. G06N 5/04
2005/0065987 A1 * 3/2005 Telkowski ........... G06F 16/119
2007/0038679 A1 * 2/2007 Ramkumar ......... H04L 67/1097
2017/0131944 A1 * 5/2017 Bruckner ............... G06F 3/067
2018/0336415 A1 * 11/2018 Anorga ................. G06N 20/00
2018/0373722 A1 12/2018 Ulasen et al.
2019/0197364 A1 * 6/2019 Cheng .................. G06F 16/113
2019/0332486 A1 * 10/2019 Aseev .................. G06F 16/907
2020/0042398 A1 * 2/2020 Martynov .............. G06F 3/067
2022/0214994 A1 * 7/2022 Narayanan ........... G06F 16/113

* cited by examiner

*Primary Examiner* — Pavan Mamillapalli
(74) *Attorney, Agent, or Firm* — Ryan, Mason & Lewis, LLP

(57) ABSTRACT

Methods, apparatus, and processor-readable storage media for data archival recommendation systems using artificial intelligence techniques are provided herein. An example computer-implemented method includes processing data associated with database operations performed across multiple database storage zones in one or more databases; generating, using one or more artificial intelligence techniques and based at least in part on the processing of data associated with the database operations performed across the multiple database storage zones, one or more temporal-based data archival recommendations for at least a portion of the multiple database storage zones in the one or more databases; and performing one or more automated actions based at least in part on the one or more temporal-based data archival recommendations.

20 Claims, 7 Drawing Sheets

STORAGE-RELATED TEMPORAL RECOMMENDATION ENGINE
414
DATABASE OPERATIONS ANALYZER
412
444-1
444-2
444-3
DML LOGS
DML LOGS
DML LOGS
431
432
433
COLD DATA STORAGE ZONE
WARM DATA STORAGE ZONE
HOT DATA STORAGE ZONE
ARCHIVE
ARCHIVE
USER DEVICE
USER DEVICE
USER DEVICE
402-1
402-2
402-3

```
input: Statement, StateClass, Classes, ValueCorpus
output: Classifier, ValueCorpus, StateValueStatus, Evaluation
begin
    for each ColumnValue ∈ Statement do
        if ColumnValue ∉ ValueCorpus then
            AddColumnValue(ColumnValue, ValueCorpus)
            for each Class ∈ Classes do
                StateValueStatus [ColumnValue][Class][1] ← 0
                StateValueStatus [ColumnValue][Class][0] ← 0
    for each ColumnValue ∈ ValueCorpus do
        if ColumnValue ∈ Statement then
            StateValueStatus [ColumnValue][StateClass][1] ← StateValueStatus [ColumnValue][StateClass][1] + 1
        else
            StateValueStatus [ColumnValue][StateClass][0] ← StateValueStatus [ColumnValue][StateClassj[0] + 1
    for each ColumnValue ∈ ValueCorpus do
        Evaluation ← EvaluateFeature(ColumnValue, StateValueStatus)
        Classifier ← UpdateClassifier(Statement, StateClass)
End
```

Figures 6, 7:
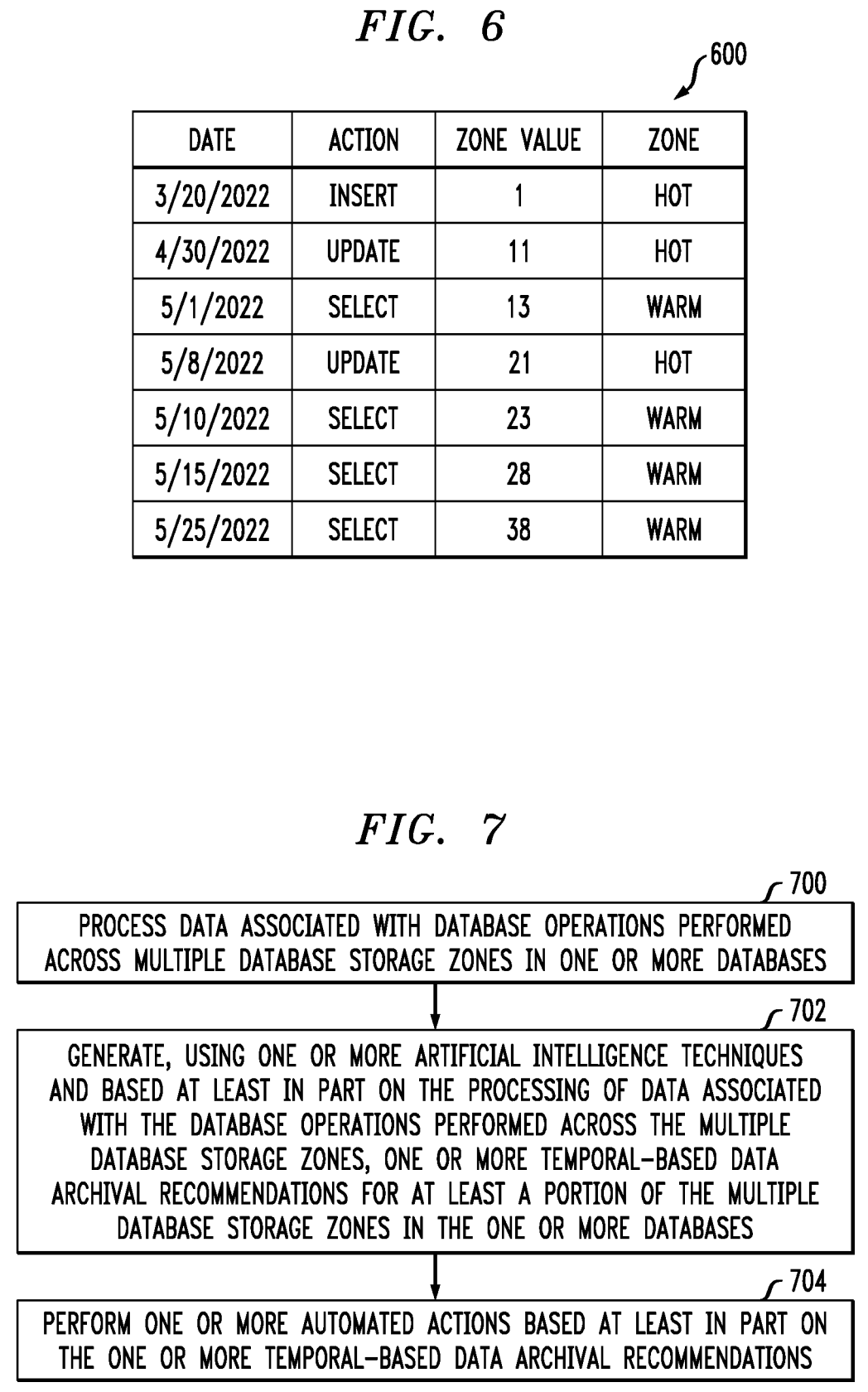

| DATE | ACTION | ZONE VALUE | ZONE |
|---|---|---|---|
| 3/20/2022 | INSERT | 1 | HOT |
| 4/30/2022 | UPDATE | 11 | HOT |
| 5/1/2022 | SELECT | 13 | WARM |
| 5/8/2022 | UPDATE | 21 | HOT |
| 5/10/2022 | SELECT | 23 | WARM |
| 5/15/2022 | SELECT | 28 | WARM |
| 5/25/2022 | SELECT | 38 | WARM |

PROCESS DATA ASSOCIATED WITH DATABASE OPERATIONS PERFORMED ACROSS MULTIPLE DATABASE STORAGE ZONES IN ONE OR MORE DATABASES

702

GENERATE, USING ONE OR MORE ARTIFICIAL INTELLIGENCE TECHNIQUES AND BASED AT LEAST IN PART ON THE PROCESSING OF DATA ASSOCIATED WITH THE DATABASE OPERATIONS PERFORMED ACROSS THE MULTIPLE DATABASE STORAGE ZONES, ONE OR MORE TEMPORAL-BASED DATA ARCHIVAL RECOMMENDATIONS FOR AT LEAST A PORTION OF THE MULTIPLE DATABASE STORAGE ZONES IN THE ONE OR MORE DATABASES

704

PERFORM ONE OR MORE AUTOMATED ACTIONS BASED AT LEAST IN PART ON THE ONE OR MORE TEMPORAL-BASED DATA ARCHIVAL RECOMMENDATIONS

DATA ARCHIVAL RECOMMENDATION SYSTEMS USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage using such systems.

BACKGROUND

In connection with increasing data generation, storage challenges can arise in selecting appropriate databases and managing the life cycles of data. Data life cycle management can include, for example, decisions related to data archiving. However, conventional data life cycle management approaches commonly include techniques which are dependent on human determinations and which are not dynamically updated with changes to corresponding users and/or enterprises, resulting in inconsistent data archival and resource wastage (e.g., utilizing additional storage and/or computing power when not necessary).

SUMMARY

Illustrative embodiments of the disclosure provide a data archival recommendation system using artificial intelligence techniques.

An exemplary computer-implemented method includes processing data associated with database operations performed across multiple database storage zones in one or more databases. The method also includes generating, using one or more artificial intelligence techniques and based at least in part on the processing of data associated with the database operations performed across the multiple database storage zones, one or more temporal-based data archival recommendations for at least a portion of the multiple database storage zones in the one or more databases. Further, the method additionally includes performing one or more automated actions based at least in part on the one or more temporal-based data archival recommendations.

Illustrative embodiments can provide significant advantages relative to conventional data life cycle management approaches. For example, problems associated with inconsistent data archival and resource wastage are overcome in one or more embodiments through generating temporal-based data archival recommendations using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 5 shows example pseudocode for updating a classifier in an illustrative embodiment.

FIG. 6 shows an example database operations and archival zone table in an illustrative embodiment.

FIG. 7 is a flow diagram of a process for generating data archival recommendations using artificial intelligence techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
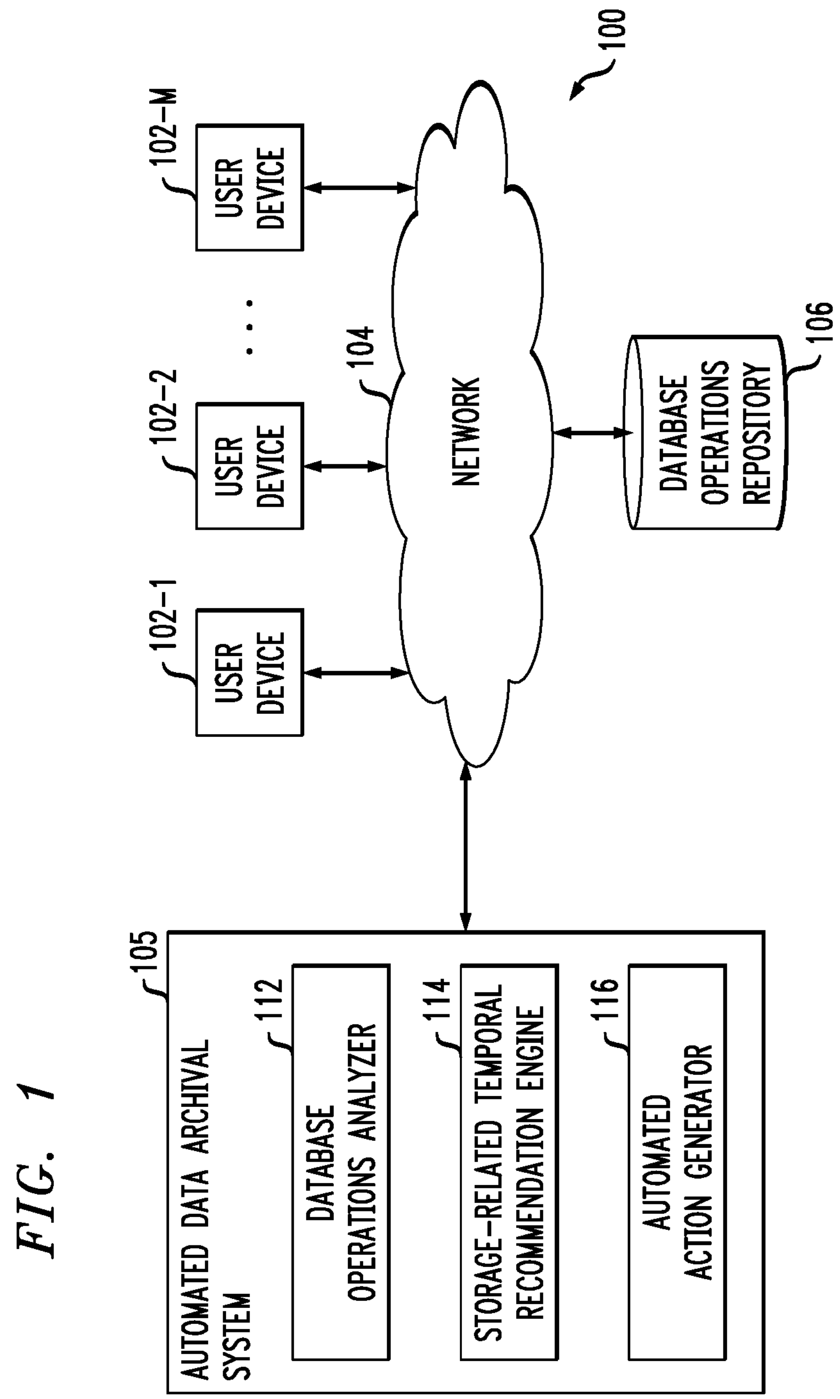
FIG. 1 shows an information processing system configured for automatically generating data archival recommendations using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated data archival system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated data archival system 105 can have an associated database operations repository 106 configured to store data pertaining to database operations, which comprise, for example, data pertaining to read operations, select operations, update operations, delete operations, etc.

The database operations repository 106 in the present embodiment is implemented using one or more storage systems associated with automated data archival system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated data archival system 105 are one or more input-output devices, which illustratively comprise keyboards, displays or other types of input-output devices in any combination. Such input-output devices can be used, for example, to support one or more user interfaces to automated data archival system 105, as well as to support communication between automated data archival system 105 and other related systems and devices not explicitly shown.

Additionally, automated data archival system 105 in the FIG. 1 embodiment is assumed to be implemented using at least one processing device. Each such processing device generally comprises at least one processor and an associated memory, and implements one or more functional modules for controlling certain features of automated data archival system 105.

More particularly, automated data archival system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated data archival system 105 to communicate over the network 104 with the user devices 102, and illustratively comprises one or more conventional transceivers.

The automated data archival system 105 further comprises a database operations analyzer 112, a storage-related temporal recommendation engine 114, and an automated action generator 116.

It is to be appreciated that this particular arrangement of elements 112, 114 and 116 illustrated in the automated data archival system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically generating metadata-driven data archival recommendations involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated data archival system 105 and database operations repository 106 can be on and/or part of the same processing platform.

An exemplary process utilizing elements 112, 114 and 116 of an example automated data archival system 105 in computer network 100 will be described in more detail with reference to the flow diagram of FIG. 7.

Accordingly, at least one embodiment includes generating and/or implementing a data archival assistant for access-based archival by specifying one or more temporal parameters (e.g., the time to live in different storage zones and/or components) for which data can be in one or more storage zones and/or components (e.g., a hot zone, a warm zone, a cold zone, a frozen zone, etc.). Such an embodiment can include setting temporal metadata (e.g., time to live metadata) at each row of a given record based at least in part on when the data is transacted by learning in connection with database query requests and response logs integration.

As further detailed herein, one or more embodiments include measuring how users of data use the data at different storage zones (also referred to herein as temperatures). As used herein, "temperatures" attributed to different storage zones can refer to data accessibility and/or data availability. For example, in one or more embodiments, a "hot" storage zone can be associated with highly transacted data and/or a highly available transactional data store (e.g., purchase order data, customer order data, etc.). Also, a "warm" storage zone can be associated with less frequently accessed data than data in a hot storage zone (e.g., operational analytical data), and a "cold" storage zone can be associated with the least frequently accessed data (as compared to data in a hot storage zone and a warm storage zone).

For example, based at least in part on the users' use of the data, such an embodiment can include setting row-level metadata (associated with at least a portion of the data) that indicates how long the data will last at each of multiple temperatures. Setting the metadata at the row level can include, as further described herein, measuring different temperatures in the given database. In one or more embodiments, measuring the temperature of a given database can be based at least in part on configuration data and metadata associated with the database.

At least one embodiment includes implementing a continuous learning system that assesses and recommends temporal parameters of data (e.g., time to live information) in connection with at least one given storage zone (e.g., hot, warm, cold, frozen, etc.) based at least in part on access behavior data (e.g., insert-related data, update-related data, select-related data, etc.). For example, in connection with a given storage zone, a time to live recommendation can include removing one or more performance bottlenecks before being encountered by the user. Such a proactive recommendation can assist entities such as, for example, database administrators, systems engineers, etc., make informed decisions about the archival of the data. Additionally, such a recommendation can ensure that the data are appropriately available and optimized from a performance standpoint and an access standpoint.

Accordingly, one or more embodiments include implementing database-specific assistance that analyzes data manipulation language (DML) performed in connection with the database to learn and generate time to live recommendations for one or more given storage zones.

Figure 2:
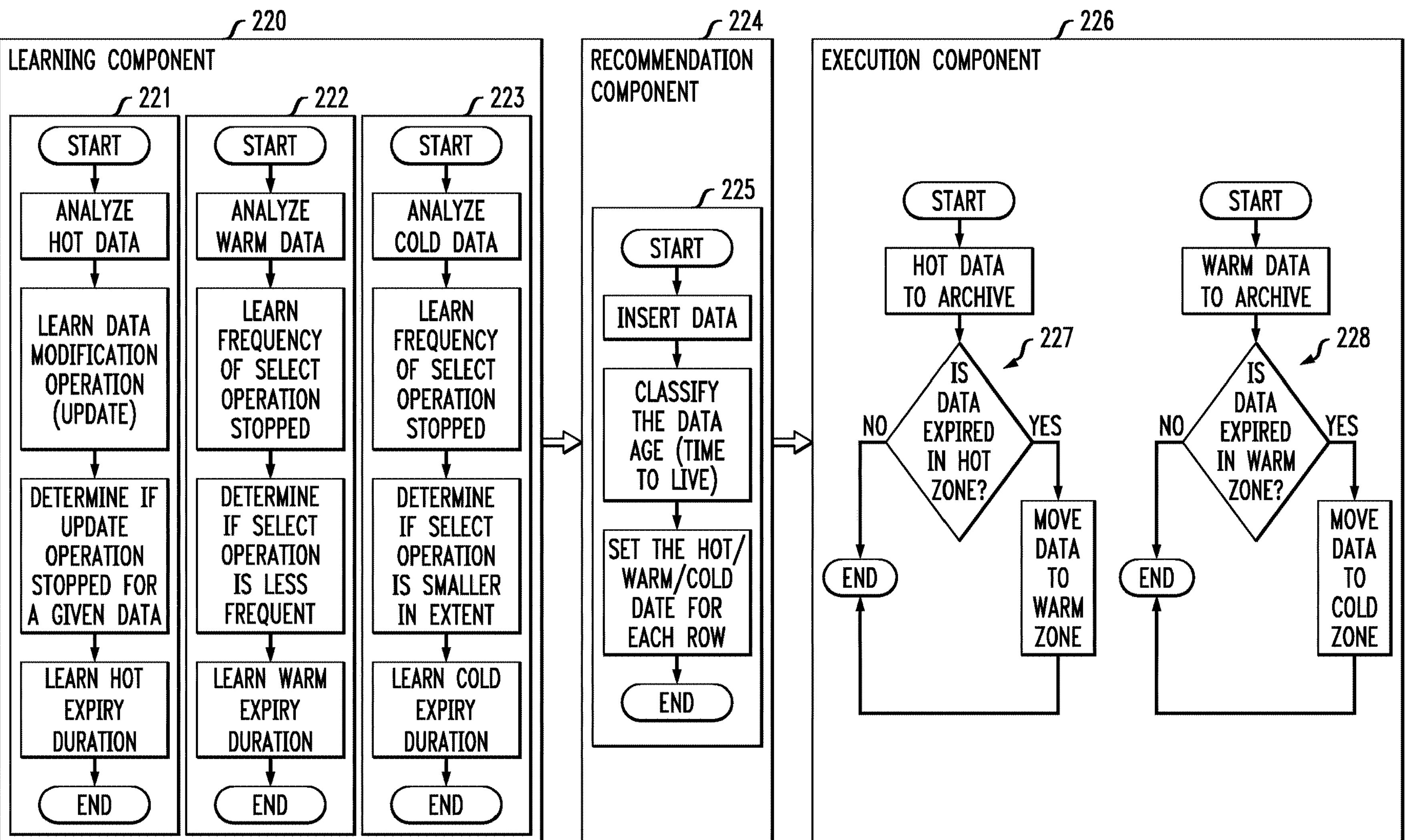
FIG. 2 shows an example workflow associated with carrying out an illustrative embodiment.

FIG. 2 shows an example workflow associated with carrying out an illustrative embodiment. As depicted in FIG. 2, implementing database-specific assistance that analyzes DML performed in connection with the database to learn and generate time to live recommendations for one or more given storage zones is accomplished using a learning component 220, a recommendation component 224, and an execution component 226. In one or more embodiments, these components are configured to learn (and accumulate) information with general-purpose and database-specific entities at each of multiple storage zones (e.g., temperature zones). For example, such an embodiment can include processing data access information as associated with one or more data elements (e.g., orders, customer identifiers, etc.) and enabled in a given database, and recommending time to live information for each storage zone (e.g., temperature).

As specifically depicted in the FIG. 2 example, learning component 220 includes workflow 221, workflow 222 and workflow 223. Workflow 221 includes analyzing hot zone data, learning at least one data modification operation (e.g., update), determining if the at least one data modification operation (e.g., update) stopped for given data, and learning and/or determining hot zone expiry duration information. In at least one embodiment, if the given data have not been updated, at least a portion of such data is to be monitored for movement out of the hot zone if the data are not routinely read. Workflow 222 includes analyzing warm zone data, learning the frequency of the stoppage of a select operation, determining if a select operation is stopped less frequently than the learned frequency, and learning and/or determining warm zone expiry duration information. In at least one embodiment, with respect to the frequency of the stoppage of a select operation, if data are not frequently accessed, such data should be moved to cold storage for other purposes. Workflow 223 includes analyzing cold zone data, learning the frequency of the stoppage of a select operation, determining if a select operation is smaller in extent than the learned frequency, and learning and/or determining cold zone expiry duration information. In at least one embodiment, with respect to determining if a select operation is smaller in extent than the learned frequency, if a row is accessed then the corresponding data must be in a respective database, and if the row is less frequently accessed (e.g., accessed with a frequency that is less than a predetermined threshold), then the corresponding data can be transitioned from a hot storage zone to a warm storage zone.

The hot zone expiry duration information generated by workflow 221, the warm zone expiry duration information generated by workflow 222, and the cold zone expiry duration information generated by workflow 223 are provided to recommendation component 224 and processed as part of workflow 225. Workflow 225 includes inserting at least a portion of the above-noted expiry duration information, classifying the data age (e.g., time to live) for each zone, and setting the zone date (e.g., hot zone expiry date, warm zone expiry date, and cold zone expiry date) for each row of the given data.

Based at least in part on the recommended time to live information, the execution component 226 moves the data from one or more storage zones to one or more different storage zones (e.g., from the hot zone to the warm and cold zones), as depicted via workflows 227 and 228. For example, workflow 227 includes identifying hot zone data to archive and determining if the data in the hot zone has reached its expiry time/age. If no, no action is taken. If yes, then the data is moved from the hot zone to the warm zone. Workflow 228 includes identifying warm zone data to archive and determining if the data in the warm zone has reached its expiry time/age. If no, no action is taken. If yes, then the data is moved from the warm zone to the cold zone.

Additionally, at least one embodiment includes determining and/or understanding a database's natural language. Such an embodiment can include operating in a stealth mode while working with database queries and building a data access expertise repository from the requests and response queries of the attached database.

Figure 3:
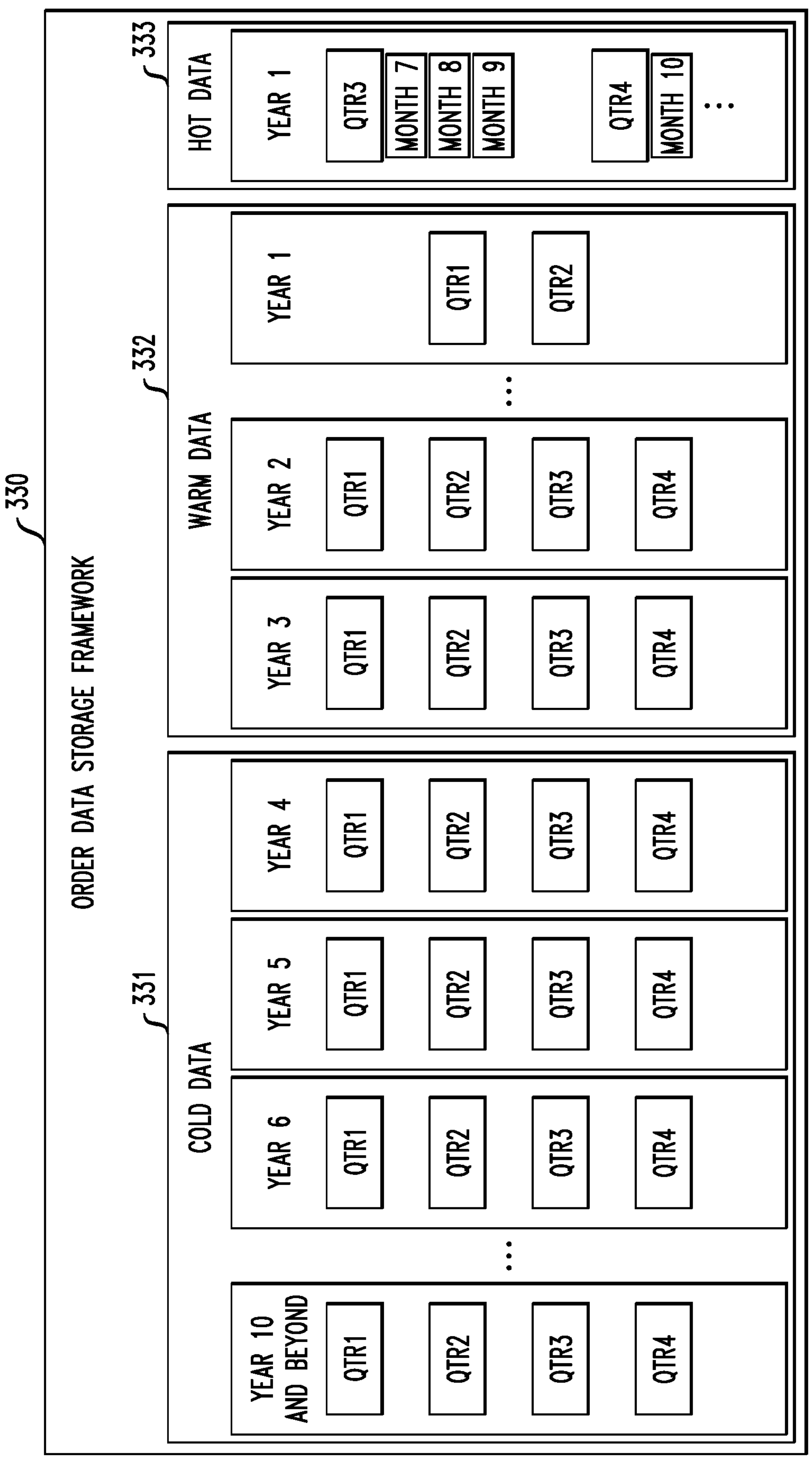
FIG. 3 shows an example multi-zone storage framework in an illustrative embodiment.

FIG. 3 shows an example multi-zone storage framework in an illustrative embodiment. By way of example, as depicted in order data storage framework 330, transaction-related data can be initially maintained in a highly available data store 333 (e.g., a hot zone), then moved to a less frequently accessed analytical data store 332 (e.g., a warm zone), and subsequently moved to a lowest access data store 331 (e.g., a cold zone such as a distributed file system, an elastic cloud storage component, etc.). Such a framework utilizes historical create, read, update, delete (CRUD) operations data on given databases and extracts at least one multidimensional feature set for training data. With respect to a multidimensional feature set, for example, data access logs can include multiple dimensions of data such as, e.g., when accessed, who accessed the data, the time taken to access the data, etc. Further, one or more embodiments includes leveraging at least one machine learning algorithm and training the at least one machine learning algorithm (e.g., at least one decision tree) using the at least one extracted multidimensional feature set to classify one or more database operations for optimal time to live recommendations.

Figure 4:
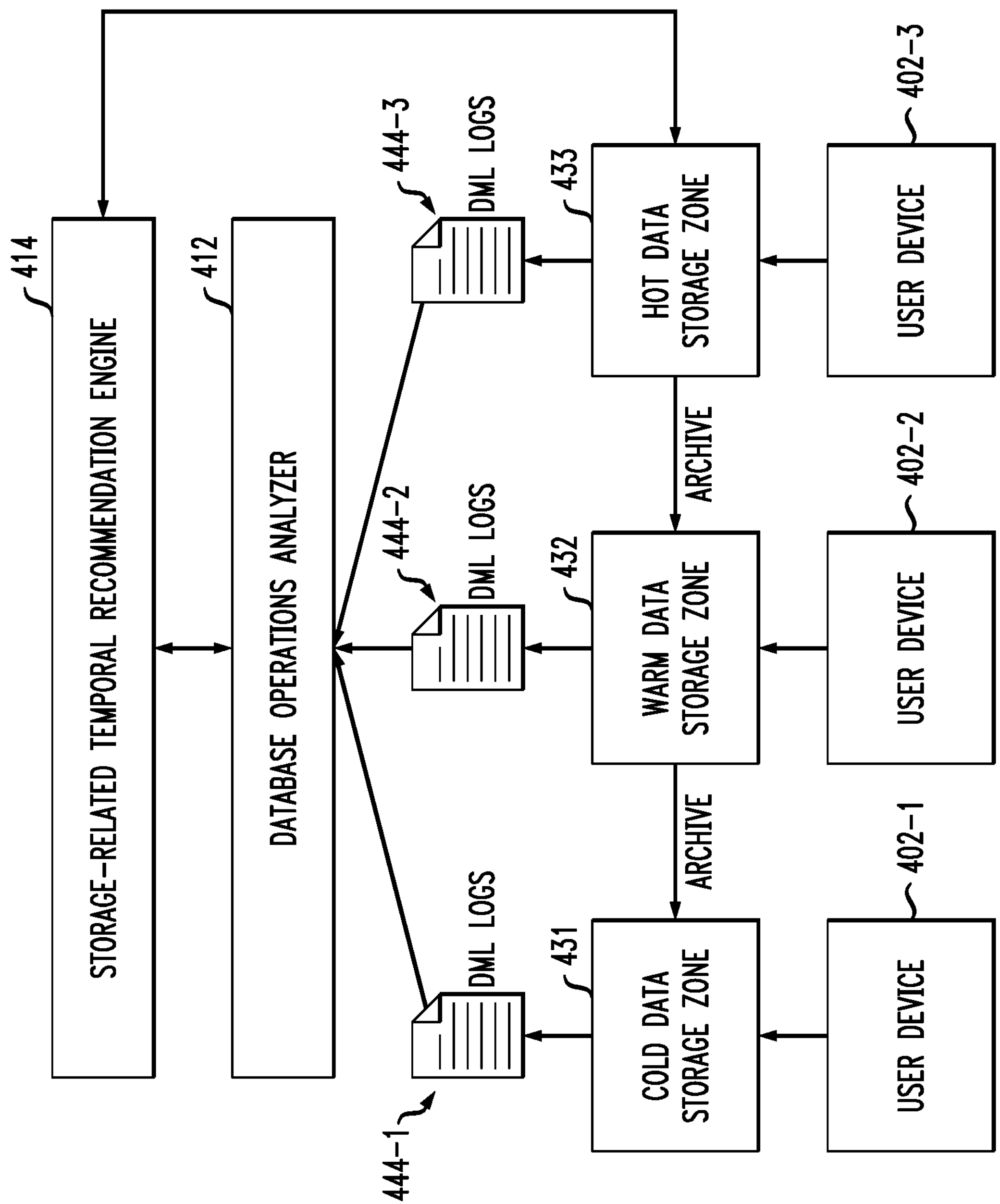
FIG. 4 shows example system architecture in an illustrative embodiment.

FIG. 4 shows example system architecture in an illustrative embodiment. As depicted in FIG. 4, user devices 402-1, 402-2 and 402-3 (collectively referred to herein as user devices 402) perform various database operations (e.g., one or more CRUD operations) on cold data storage zone 431, warm data storage zone 432 and/or hot data storage zone 433, producing and/or resulting in DML logs 444-1, 444-2 and 444-3 (collectively referred to herein as DML logs 444). Additionally, database operation analyzer 412 processes the DML logs 444, for example, with the help of at least one database corpus, and identifies performance information of at least one query consecutively. In such an embodiment, database logs can provide information about the performance of a table and/or corresponding data queries. If the table and/or data queries repeatedly exhibit poor performance, extra monitoring can be required to identify the a proper abode (e.g., storage zone) for the data.

Additionally, in one or more embodiments, the process of determining the amount of and/or number of operations on a given table, identifying those operations, and determining the data being accessed is carried out by database operations analyzer 412. In such an embodiment, database operations analyzer 412 processes one or more database access logs (e.g., DML logs 444), determines and/or generates at least one attribute collection based at least in part thereon, and extracts at least one access query based at least in part on the attribute collection(s). In an attribute collection stage, attributes that can be extracted from database transaction logs can include attributes related to, by way merely of example, database type, table(s), operation time, type of query and associated data, etc.

As also detailed herein, in at least one embodiment, storage-related temporal recommendation engine 414 generates, based at least in part on input from database operations analyzer 412, time to live determinations and/or data ages for given objects and given rows, and recommends the time to live determinations for given portions of data associated with the given data objects and the given rows. As also depicted in FIG. 4, the bi-directional arrow between storage-related temporal recommendation engine 414 and hot data storage zone 433 represents one or more requests and one or more responses. Such a request can include a request for lifecycle information pertaining to given data, and such a related response can include information pertaining to setting such lifecycle information in each row of a given database.

If a given task includes identification of one or more unique rows in a given table, wherein features capture the presence of a list of columns in the table, any model based on static and/or fixed features will become unusable, as one would expect that different sets of columns would be most relevant to groups of the rows for an individual record at different periods of time. Data, in situations wherein changes are the norm rather than the exception, are subject to what is referred to as concept drift. As used herein, concept drift can describe a situation, for example, wherein a prediction is dependent on a secret and/or dynamic context that is not immediately or directly available to the system. Additionally, concept drift can be described in terms of time and/or space dimensions.

Applications of incremental learning, in which the algorithm adapts by updating itself one training example at a time on flowing data, can include, for example, classification data analysis applications subject to concept drift. Learning algorithms that can handle concept drift can include feature-based learning algorithms, as the learning is based at least in part on at least one new subset of features, much like learning is based at least in part on at least one new instance in instance-based algorithms.

By way of example, in one or more embodiments, insert, update and/or select operations can provide and/or result in at least one new set of data. Accordingly, such an embodiment includes leveraging dynamic feature space and incremental feature selection techniques. For example, such an embodiment can include implementing, in conjunction, an incremental feature ranking method (also referred to herein as an incremental attribute ranking method) and an incremental learning algorithm that can consider a subset of features during prediction. For text classification, for example, filters can be used that assess each feature's predictive power and select the N best features.

Additionally, such an embodiment can include assessing each of multiple column values in accordance with cumulative statistics regarding the frequency with which the column appears in various classes of insert, update, and select statements. Accordingly, such methods can be incremental, wherein when new data are received, the statistics are updated, allowing for the calculation of the evaluation without the need to go back and process earlier data. By adding new data values to the vocabulary and initializing corresponding statistics, such methods can also handle new data values. As a result, one or more embodiments can include implementation in connection with various techniques, such as, for example, information gain, the chi-squared statistic, and/or mutual information.

With each incremental re-evaluation and addition of insert, update and select data values, certain values may be promoted to or demoted from the top N words, which can raise a problem that necessitates the second component of one or more embodiments, namely, a learning algorithm capable of classifying a new instance while taking different features into account over time. Such a learning algorithms, which can deal with such parameters, are referred to herein as feature-based because the learning is based at least in part on the new subset of features.

By way merely of example, naïve Bayes and k-nearest neighbors are two such feature-based algorithms. In both of these algorithms, each feature contributes independently to the prediction of a class. As a result, these algorithms are expandable to instantiate the second component of one or more embodiments. Specifically, when these algorithms are used to classify a new instance, an additional parameter denoting a subset of the selected features can be provided. For example, implementation of a naïve Bayes algorithm includes considering the calculated probabilities of this subset, whereas implementation of a k-nearest neighbors algorithm includes calculating the distance between the new instance and the stored examples using only this feature subset. It should be appreciated that, in accordance with at least one embodiment, such a framework can be applied to any classifier that can be converted into a feature-based classifier.

FIG. 5 shows example pseudocode for updating a classifier in an illustrative embodiment. In this embodiment, example pseudocode 500 is executed by or under the control of at least one processing system and/or device. For example, the example pseudocode 500 may be viewed as comprising a portion of a software implementation of at least part of automated data archival system 105 of the FIG. 1 embodiment.

The example pseudocode 500 illustrates determining if, when a new insert, update and select document arrives as an example of class StateClass, the document contains any new column values. If a new column value is found, the new value is added to the ValueCorpus, and the AddColumn Value of that Column Value is set to zero. Then, for each column in the ValueCorpus, the feature evaluation metric is recalculated and the counts are updated based on the new document. Finally, the classifier is updated based on the new example and any new column values.

It is to be appreciated that this particular example pseudocode shows just one example implementation of updating a classifier, and alternative implementations can be used in other embodiments.

In at least one embodiment, at least one algorithm (e.g., naïve Bayes and/or k-nearest neighbors) selects the top N statement column values based at least in part on their evaluation for classifying a new unlabeled statement, and then predicts the class of the statement (i.e., the new unlabeled statement) using only a given selected feature subset. Additionally, in one or more embodiments, a table can be implemented which divides data into zones such as, for example, a hot zone and a warm zone, based at least in part on the given statement, the given column, and the given value. By way merely of example, a given customer and/or a given product associated only with select operations can be classified in the warm zone, while a given customer and/or a given product associated with insert and update operations can be classified in the hot zone. Also, in one or more embodiments, based on the time that the zone(s) has been determined, the time value associated with the zone is incremented.

FIG. 6 shows an example database operations and archival zone table 600 in an illustrative embodiment. By way of example, as depicted in FIG. 6, assume that a record with a first customer, a first product, and a first category was inserted into the database on March 20$^{th}$, the zone is a hot zone, and the zone value is 1. The same record was updated on April 30$^{th}$, so the corresponding zone value is 11. On May 1$^{st}$, a select operation is carried out, and the corresponding zone value is 13 and the corresponding zone is a warm zone (e.g., the row of the data moved from hot to warm). Further, there is an update on May 8$^{th}$, the corresponding zone is a hot zone, and the corresponding zone value is 21. In one or more embodiments, the various zone values can be calculated based at least in part on the particular action and the date on which the particular action was performed for a given row. Subsequent to the above-noted update operation, only select operations are carried out on different days, and the zone transitions to a warm zone, as described below.

Based on this example data collection, the data associated with a combination of the first customer, the first product, and the first category is categorized in a hot zone for 21 days, and is categorized in a warm zone for 38 days. If any record is inserted (e.g., into the given database) with this combination, the time to live in a hot zone is estimated at 21 days, and time to live in a warm zone is estimated at 38 days.

Additionally, one or more embodiments include generated and/or implementing one or more archival recommendations, wherein at least one machine learning model (e.g., naïve Bayes and/or k-nearest neighbors) predicts and makes suggestions based at least in part on the expected lifespan of the data in one or more database storage zones based on the corresponding table(s), the corresponding column(s), and the corresponding value(s) for the row(s) being inserted because the data are classified according to the access logs whenever new data is added. The expected lifespan value is retained with the system value for the table and rows, and each table and/or collection model includes this system column by default. Further, in at least one embodiment, any subsequent archiving can be carried out using this system column.

Accordingly, one or more embodiments include generating and/or implementing row and/or record metadata-driven archiving determinations. When inserting or creating data, such an embodiment includes generating and/or implementing the row-level metadata that can be used in determining the age of the data. Additionally, at least one embodiment includes processing information pertaining to database operations across one or more databases and/or database zones to determine time to live estimations and/or data age estimations in every database zone (e.g., temperature designation) at the row and/or record level using at least one machine learning model, wherein the at least one machine learning model is trained using at least one historical database query plan and one or more additional features. In one or more embodiments, initial features can include, for example, operation identifying information with date-time information on the row considered in the model training. Additional features can include, for example, identifying information of the system and/or person accessing the data, the geographic region (e.g., country) from where a request was triggered, etc.).

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations based on database operations data collected from various devices (e.g., user devices 102), and such recommendations can be used to initiate one or more automated actions (e.g., automated data archival actions).

FIG. 7 is a flow diagram of a process for generating data archival recommendations using artificial intelligence techniques in an illustrative embodiment. It is to be understood that this particular process is only an example, and additional or alternative processes can be carried out in other embodiments.

In this embodiment, the process includes steps 700 through 704. These steps are assumed to be performed by the automated data archival system 105 utilizing elements 112, 114 and 116.

Step 700 includes processing data associated with database operations performed across multiple database storage zones in one or more databases. In at least one embodiment, the multiple database storage zones correspond to multiple levels of data access frequency (e.g., a hot zone, a warm zone, a cold zone, etc.). Also, processing data associated with database operations performed across multiple database storage zones can include identifying one or more database operations carried out on at least a portion of the one or more databases, and determining data being accessed in connection with each of the one or more database operations.

Additionally or alternatively, in one or more embodiments, processing data associated with database operations performed across multiple database storage zones includes processing data manipulation language logs associated with the multiple database storage zones in the one or more databases. In such an embodiment, processing data manipulation language logs associated with the multiple database storage zones can include determining one or more data attributes based at least in part on the processing of the data manipulation language logs. Further, determining the one or more data attributes can include determining, within at least a portion of the data manipulation language logs, data related to at least one of database type, one or more database tables, operation time, and query type.

Step 702 includes generating, using one or more artificial intelligence techniques and based at least in part on the processing of data associated with the database operations performed across the multiple database storage zones, one or more temporal-based data archival recommendations for at least a portion of the multiple database storage zones in the one or more databases.

In one or more embodiments, generating one or more temporal-based data archival recommendations includes generating, for at least one given item of data, at least one time to live recommendation associated with at least one of the multiple database storage zones, wherein each time to live recommendation specifies an amount of time that the given item of data is to be stored in a corresponding one of the multiple database storage zones. Additionally or alternatively, in at least one embodiment, generating one or more temporal-based data archival recommendations can include implementing, in connection with one or more outputs of the processing of data associated with the database operations performed across the multiple database storage zones, at least one incremental attribute ranking algorithm and at least one incremental learning algorithm. In such an embodiment, implementing at least one incremental learning algorithm can include implementing one or more of at least one naïve Bayes algorithm and at least one k-nearest neighbors algorithm.

Step 704 includes performing one or more automated actions based at least in part on the one or more temporal-based data archival recommendations. In at least one embodiment, performing one or more automated actions includes automatically generating and inserting, at one or more rows associated with at least a portion of the data, metadata pertaining to at least one of the one or more temporal-based data archival recommendations. Additionally or alternatively, performing one or more automated actions can include automatically training at least a portion of the one or more artificial intelligence techniques using feedback related to the one or more temporal-based data archival recommendations, and/or automatically outputting at least one of the one or more temporal-based data archival recommendations to one or more database administration systems.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate metadata-driven data archival recommendations using artificial intelligence techniques. These and other embodiments can effectively overcome problems associated with inconsistent data archival and resource wastage.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
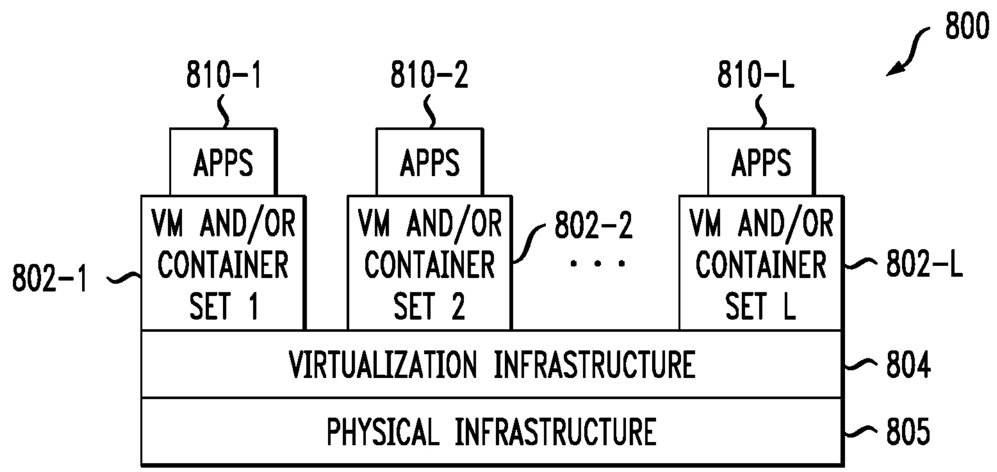
FIGS. 8 and 9 show examples of processing platforms that may be utilized to implement at least a portion of an information processing system in illustrative embodiments.
Figure 9:
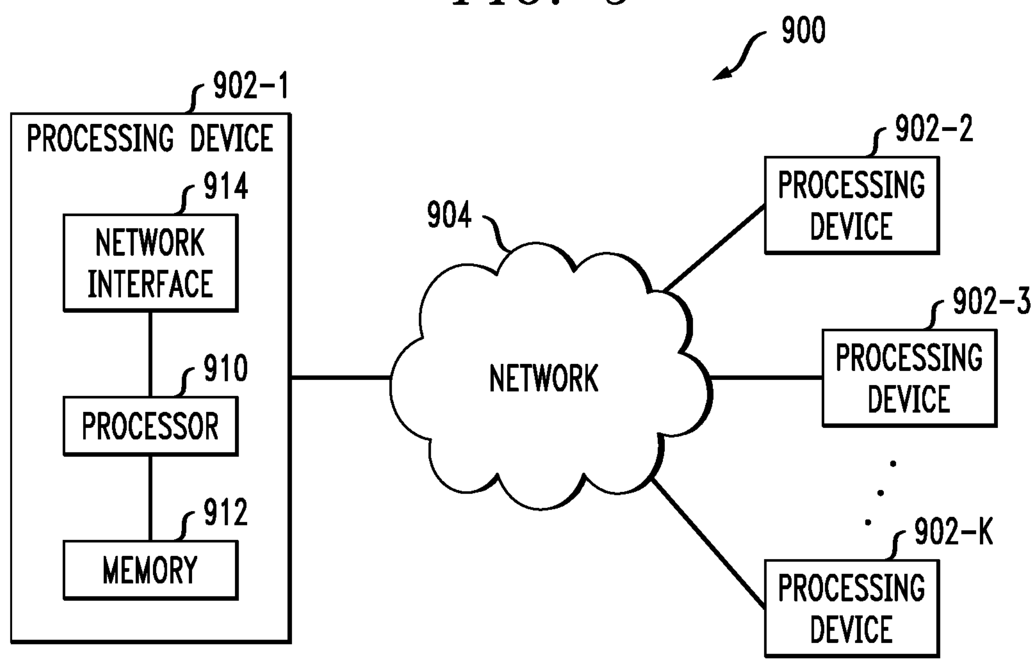

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more information processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a CPU, a GPU, a TPU, a microcontroller, an ASIC, a FPGA or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

processing data associated with database operations performed across multiple database storage zones in one or more databases;

generating, using one or more artificial intelligence techniques and based at least in part on the processing of data associated with the database operations performed across the multiple database storage zones, one or more temporal-based data archival recommendations for at least a portion of the multiple database storage zones in the one or more databases, wherein generating one or more temporal-based data archival recommendations comprises (i) generating, for at least one given item of data, at least one recommendation indicating at least one amount of time that the at least one given item of data is to be stored in at least a first of the multiple database storage zones before the at least one given item of data is to be moved to at least a second of the multiple database storage zones, and (ii) generating one or more data availability parameters to be associated with each of one or more of the first and second database storage zones of the at least one recommendation; and performing one or more automated actions based at least in part on the one or more temporal-based data archival recommendations;

wherein the method is performed by at least one processing device comprising a processor coupled to a memory.

2. The computer-implemented method of claim 1, wherein the multiple database storage zones correspond to multiple levels of data access frequency.

3. The computer-implemented method of claim 1, wherein performing one or more automated actions comprises automatically generating and inserting, at one or more rows associated with at least a portion of the data, metadata pertaining to at least one of the one or more temporal-based data archival recommendations.

4. The computer-implemented method of claim 1, wherein processing data associated with database operations performed across multiple database storage zones comprises identifying one or more database operations carried out on at least a portion of the one or more databases, and determining data being accessed in connection with each of the one or more database operations.

5. The computer-implemented method of claim 1, wherein processing data associated with database operations performed across multiple database storage zones comprises processing data manipulation language logs associated with the multiple database storage zones in the one or more databases.

6. The computer-implemented method of claim 5, wherein processing data manipulation language logs associated with the multiple database storage zones comprises determining one or more data attributes based at least in part on the processing of the data manipulation language logs.

7. The computer-implemented method of claim 6, wherein determining the one or more data attributes comprises determining, within at least a portion of the data manipulation language logs, data related to at least one of database type, one or more database tables, operation time, and query type.

8. The computer-implemented method of claim 1, wherein generating one or more temporal-based data archival recommendations comprises implementing, in connection with one or more outputs of the processing of data associated with the database operations performed across the multiple database storage zones, at least one incremental attribute ranking algorithm and at least one incremental learning algorithm.

9. The computer-implemented method of claim 8, wherein implementing at least one incremental learning algorithm comprises implementing one or more of at least one naïve Bayes algorithm and at least one k-nearest neighbors algorithm.

10. The computer-implemented method of claim 1, wherein performing one or more automated actions comprises automatically training at least a portion of the one or more artificial intelligence techniques using feedback related to the one or more temporal-based data archival recommendations.

11. The computer-implemented method of claim 1, wherein performing one or more automated actions comprises automatically outputting at least one of the one or more temporal-based data archival recommendations to one or more database administration systems.

12. A non-transitory processor-readable storage medium having stored therein program code of one or more software programs, wherein the program code when executed by at least one processing device causes the at least one processing device:

to process data associated with database operations performed across multiple database storage zones in one or more databases;

to generate, using one or more artificial intelligence techniques and based at least in part on the processing of data associated with the database operations performed across the multiple database storage zones, one or more temporal-based data archival recommendations for at least a portion of the multiple database storage zones in the one or more databases, wherein generating one or more temporal-based data archival recommendations comprises (i) generating, for at least one given item of data, at least one recommendation indicating at least one amount of time that the at least one given item of data is to be stored in at least a first of the multiple database storage zones before the at least one given item of data is to be moved to at least a second of the multiple database storage zones, and (ii) generating one or more data availability parameters to be associated with each of one or more of the first and second database storage zones of the at least one recommendation; and to perform one or more automated actions based at least in part on the one or more temporal-based data archival recommendations.

13. The non-transitory processor-readable storage medium of claim 12, wherein the multiple database storage zones correspond to multiple levels of data access frequency.

14. The non-transitory processor-readable storage medium of claim 12, wherein performing one or more automated actions comprises automatically generating and inserting, at one or more rows associated with at least a portion of the data, metadata pertaining to at least one of the one or more temporal-based data archival recommendations.

15. An apparatus comprising:

at least one processing device comprising a processor coupled to a memory;

the at least one processing device being configured:

to process data associated with database operations performed across multiple database storage zones in one or more databases;

to generate, using one or more artificial intelligence techniques and based at least in part on the processing of data associated with the database operations performed across the multiple database storage zones, one or more temporal-based data archival recommendations for at least a portion of the multiple database storage zones in the one or more databases, wherein generating one or more temporal-based data archival recommendations comprises (i) generating, for at least one given item of data, at least one recommendation indicating at least one amount of time that the at least one given item of data is to be stored in at least a first of the multiple database storage zones before the at least one given item of data is to be moved to at least a second of the multiple database storage zones, and (ii) generating one or more data availability parameters to be associated with each of one or more of the first and second database storage zones of the at least one recommendation; and to perform one or more automated actions based at least in part on the one or more temporal-based data archival recommendations.

16. The apparatus of claim 15, wherein the multiple database storage zones correspond to multiple levels of data access frequency.

17. The apparatus of claim 15, wherein performing one or more automated actions comprises automatically generating and inserting, at one or more rows associated with at least a portion of the data, metadata pertaining to at least one of the one or more temporal-based data archival recommendations.

18. The apparatus of claim 15, wherein processing data associated with database operations performed across multiple database storage zones comprises identifying one or more database operations carried out on at least a portion of the one or more databases, and determining data being accessed in connection with each of the one or more database operations.

19. The apparatus of claim 15, wherein processing data associated with database operations performed across multiple database storage zones comprises processing data manipulation language logs associated with the multiple database storage zones in the one or more databases.

20. The apparatus of claim 15, wherein performing one or more automated actions comprises automatically outputting at least one of the one or more temporal-based data archival recommendations to one or more database administration systems.

* * * * *